United States Patent [19]

Chinchen

[11] Patent Number: 4,540,563
[45] Date of Patent: Sep. 10, 1985

[54] HYDROGEN PRODUCTION

[75] Inventor: Godfrey C. Chinchen, Cleveland, England

[73] Assignee: Imperial Chemical Industries PLC, United Kingdom

[21] Appl. No.: 589,336

[22] Filed: Mar. 14, 1984

Related U.S. Application Data

[62] Division of Ser. No. 359,834, Mar. 19, 1982, abandoned.

[30] Foreign Application Priority Data

Mar. 26, 1981 [GB] United Kingdom ................. 8109501

[51] Int. Cl.$^3$ ............................................... C01B 2/10
[52] U.S. Cl. ................................ 423/656; 502/302; 502/304; 502/338
[58] Field of Search .................. 423/656, 415 R, 302, 423/304, 338

[56] References Cited

U.S. PATENT DOCUMENTS

| 989,955 | 4/1911 | Ellenberger | 423/656 |
|---|---|---|---|
| 1,330,772 | 2/1920 | Bosch et al. | |
| 1,375,932 | 4/1921 | Rideal et al. | 423/656 |
| 1,489,497 | 4/1924 | Larson | 423/656 |
| 1,797,426 | 3/1931 | Larson | |
| 2,197,707 | 4/1940 | Crittendon | 423/656 |

FOREIGN PATENT DOCUMENTS

| 204628 | of 0000 | Canada . | |
|---|---|---|---|
| 19458 | 3/1922 | France | 423/656 |
| 459918 | 6/1948 | France | 423/656 |
| 512543 | 11/1953 | France | 423/656 |
| 674475 | 1/1961 | France | 423/656 |
| 125410 | 4/1919 | United Kingdom | 423/656 |
| 352861 | 6/1933 | United Kingdom | 423/656 |
| 352864 | of 0000 | United Kingdom . | |
| 604376 | 7/1948 | United Kingdom | 423/656 |
| 961860 | 6/1964 | United Kingdom | 423/656 |

Primary Examiner—John Doll
Assistant Examiner—Wayne A. Langel
Attorney, Agent, or Firm—Cushman, Darby & Cushman

[57] ABSTRACT

The shift reaction of carbon monoxide with steam to give carbon dioxide and hydrogen is carried out over a catalyst comprising iron oxide and at least one further metal oxide that is difficultly reducible to metal, contains metal exerting a valency of at least 2 and is incapable of forming a mixed oxide having the spinel structure $M^{II}M^{III}M_2O_4$ where $M^{II}$ is a divalent metal and $M^{III}$ is a trivalent metal.

2 Claims, No Drawings

HYDROGEN PRODUCTION

This is a division of application Ser. No. 359,834, filed Mar. 19, 1982, abandoned.

This invention relates to hydrogen and to a catalytic carbon monoxide shift process for producing it.

The shift reaction $$CO + H_2O \rightarrow CO_2 + H_2$$

at so-called "high temperatures", that is, at over 300° C., is routinely carried out over a catalyst containing iron oxide and chromium oxide. Making such a catalyst and also handling spent catalyst after exposure to air usually expose operators to dust containing hexavalent chromium oxide compounds. Some success has been achieved (our European published application 19989) to use chromium only in trivalent form, but there remains a degree of toxic hazard. We have now found that certain other oxides can replace chromium in the shift catalyst.

According to the invention the shift reaction of carbon monoxide with steam to give carbon dioxide and hydrogen is carried out over a catalyst comprising iron oxide and at least one further metal oxide that is difficultly reducible (as hereinafter defined), contains metal exerting a valency of at least 2 and is incapable of forming a mixed oxide having the spinel structure $M^{II}M^{III}_2O_4$ where $M^{II}$ is a divalent metal and $M^{III}$ is a trivalent metal.

By "difficultly reducible" it is meant that the metal oxide is at least as difficult to reduce to metal as divalent chromium oxide. In terms of electrode potentials, this means that the metal has a negative electrode potential greater than about 0.55 volts, according to the table on pages D-145-146 of the 58th edition (1977–1978) of the CRC Handbook of Chemistry and Physics.

Oxides incapable of forming such a mixed oxide having the spinel structure include those of metals having
(a) a valency of at least 4 and an ionic radius of at least 0.07 nm (for example zirconium, hafnium, thorium or uranium); and
(b) a valency of 2 or 3 and an ionic radius of at least 0.09 nm (for example calcium, strontium, barium, yttrium and most rare earths, including mixed rare earths such as "didymium").

The proportion of the further metal oxide is chosen to give adequate stabilization of the catalytic activity of the iron oxide without unduly diluting the active oxide. The outer limits of usefulness appear to be 0.2 and 50% by weight of such oxide calculated on the non-volatiles stable in air at 900° C., such that the iron oxide is $Fe_2O_3$. A more useful range is 1–30, especially 5–20% w/w.

The catalyst can, if desired, contain some spinel-forming oxide (other than iron oxide), whether divalent or trivalent. The content of such oxide is preferably less than 5, preferably less than 1, % w/w and, in the case of $Cr_2O_3$, more preferably less than 0.1%, in order to minimise the toxic hazard. Other tolerable trivalent metal oxides are those of aluminium, vanadium and manganese. Among divalent metal oxides those of copper, zinc and cadmium can be used, but magnesium is generally considered undesirable. Those of cobalt and nickel are tolerable at up to about 2% w/w but not higher unless the shift process is to be operated at an unusually high steam to dry gas ratio.

The invention provides the catalyst in active forms in which the iron is an oxidation state in equilibrium with the shift reaction mixture. Typically the iron oxide of such a catalyst has the empirical formula $FeO_x$ where $x$ is between 1 and 1.4. Such an iron oxide is present during the shift reaction and in the catalyst after a reductive activation step preliminary to starting up the shift reaction. It may also be present in an oxide composition made by reducing an $Fe_2O_3$ oxide mixture to the $FeO_x$ state and then stabilizing it by superficial oxidation or other surface treatment.

It is believed that certain of the oxide compositions which are usuable as catalyst for the shift process or are convertible to active shift catalysts by reduction are new compositions of matter. These and their characterising properties are set out in Table 1.

TABLE 1

| | Oxide other than iron oxide | | |
|---|---|---|---|
| | Ca, Sr or Ba* | Rare earth** | Zr or Hf*** |
| % w/w of comp. | 8–25 | 8–25 | 8–25 |
| Surface area $m^2 g^{-1}$ | 50–100 | 100–250 | 50–200 |
| Helium density $g\,cm^{-3}$ | 3.0–4.0 | 3.5–4.5 | 3.0–4.0 |
| Mercury density $g\,cm^{-3}$ | 1.4–1.8 | 1.4–1.8 | 1.6–2.2 |
| Pore volume $cm^3 g^{-1}$ | 0.2–0.5 | 0.3–0.6 | 0.2–0.4 |
| Mean pore radius nm | 6–10 | 3–6 | 3–6 |

*calculated at equivalent CaO
**calculated as equivalent $CeO_2$
***calculated as equivalent $ZrO_2$ The catalysts can be made by any method that brings the oxides together intimately enough for the further oxide to stabilize the active structure of the iron oxide. Generally this involves forming a solid compound, especially an oxide or hydrated oxide at the surface of the iron oxide by decomposition of a soluble or molten compound of the metal of the further oxide. Preferably the iron oxide is a highly porous state, for example has been freshly formed, or is being formed from a water soluble compound. Thus for example the nitrates of iron and the further metal can be decomposed together; or the further metal nitrate can be decomposed thermally on the iron oxide or hydrated iron oxide; or (as is preferred) the hydrated oxides can be brought together by double decomposition of water soluble salts with an alkaline precipitant such as a hydroxide, carbonate, bicarbonate or oxalate of an alkali metal or ammonium. The soluble salts are preferably nitrates, but others, for example sulphates, can be used if the precipitate is adequately washed to remove sulphate. Naturally sulphates are unsuitable when the further metal is calcium, strontium or barium.

The shift reaction is carried out typically at outlet temperatures in the range 350°–600° C., with inlet temperature in the range 300°–500° C. The pressure is usually in the range 1–100 bar abs. and the steam to dry gas ratio at least 0.2 by volume. Thus the shift is of the "high temperature" type and can be operated in any suitable process sequence, for example in treating steam reformer gas, partial oxidation gas or coal gasification gas or in gasifying methanol.

EXAMPLE 1

Iron and calcium

Solutions used:
A. Ferric nitrate stock solution (14.5 g iron per 100 ml): 13.8 l
Calcium nitrate tetrahydrate: 2.676 kg
Water to 15 l at 25° C.
B. Sodium carbonate 9.2 kg in 17 l solution at 25° C.
Procedure:
Part (31 l) of solution A was added at 25° C. with stirring to solution B, also at 25° C. The slurry was boiled by injecting live steam. A further 1 liter of A was added and the slurry heated to 80° C. Then the rest of A was added. The slurry was then weakly alkaline (25 ml of N HCl per 100 ml of filtrate) and had a total volume of 70 l. The solid phase was separated and washed, then collected on a filter. The filter cake was dried at 130° C. and analysed. Its composition % $^w$/w is set out in Table 2. A sample of it was compressed into cylinders 3.6 mm high ×5.4 mm diameter, the form in which it is to be used in a catalytic reactor. Table 3 shows its relevant physical properties, in comparison with commercial Fe Cr shift catalysts X and Y.

EXAMPLE 2

Iron and cerium

Solutions used:
A. Ferric nitrate stock solution
(14.5 g iron per 100 ml): 13.8 l
Cerium III nitrate hexahydrate: 0.842 kg
Water to 15 l at 25° C.
B. Sodium carbonate 9.0 kg in 17 l solution at 80° C.
Procedure:
Part (14 l) of solution A was added with stirring to solution B over 25 minutes. The slurry was tested and found to be moderately alkaline (80 ml of N HCl per 100 ml of filtrate) and accordingly the rest of solution A was stirred in, to give a final alkalinity of 50 ml of N HCl. The slurry was heated to 75° C. with live steam and aged for 30 minutes, by which time its volume was 50 l. The solid phase was separated and washed and then collected on a filter. The filter cake was dried at 165° C. for 16 hours and analysed. Its composition % $^w$/w is set out in Table 2. A sample of it was compressed into cylinders 3.6 mm high ×5.4 mm diameter, the form in which it is to be charged to a catalytic reactor. Table 3 shows it relevant physical properties, in comparison with those of two commercially available iron-chromia shift catalysts X and Y.

EXAMPLE 3

Iron and zirconium

Solutions used:
A. Ferric nitrate stock solution
(14.5 g Fe per 100 ml): 13.8 l
Zirconium nitrate solution 20% $^w$/w: 4.377 l
Water to 20 l at 24° C.
B. Sodium carbonate 9.2 kg in 24 l solution at 75° C.
Procedure:
Solution A was added to solution B over 30 minutes. The final alkalinity was 27 ml n HCl per 100 ml and the temperature 37° C. The solid phase was separated, washed and collected on a filter. The filter cake was dried at 160° C. for 12 hours. It had the composition % $^w$/w set out in Table 2. The physical properties of this oxide composition in catalyst pellet form are shown in Table 3.

TABLE 2

| | Catalyst | | | | |
| | Example | | | Commercial | |
| % w/w | 1 Ca | 2 Ce | 3 Zr | X Cr | Y Cr |
|---|---|---|---|---|---|
| $Na_2O$ | 0.23 | 0.20 | 1.2 | 0.04 | 0.18 |
| $Fe_2O_3$ | 61.9 | 69.7 | 57.0 | 75.7 | 78.5 |
| oxide* | 13.5 | 9.7 | 18.8 | 7.1 | 8.5 |
| $SO_3$ | under 0.02 | under 0.02 | 0.04 | 0.15 | 0.16 |
| loss at 900° C. | 23.8 | 19.1 | 16.9 | 16.0 | 10.8 |

*see head of columns 1–3, X and Y

TABLE 3

| | Catalyst | | | | |
| | Example | | | Commercial | |
| Property | 1 | 2 | 3 | X | Y |
|---|---|---|---|---|---|
| Surface area $m^2 g^{-1}$ | 83.9 | 183.5 | 116.6 | 130 | 40 |
| Helium density $g\ cm^{-3}$ | 3.57 | 4.02 | 3.60 | 4.27 | 4.44 |
| Mercury density $g\ cm^{-3}$ | 1.63 | 1.55 | 1.91 | 1.85 | 1.74 |
| Pore volume $cm^3 g^{-1}$ | 0.33 | 0.40 | 0.25 | 0.31 | 0.35 |
| Mean pore radius nm | 8.0 | 4.5 | 4.5 | 4.6 | 17.5 |
| Pellet density $g\ ml^{-1}$ | 1.65 | 1.64 | 1.95 | 1.90 | 1.65 |
| Mean vertical crushing strength kg | 117.5 | 102 | 86 | 120 | 100 |

Shift process using these catalysts

Each catalyst was operated in the following conditions:
Pressure: 31 bar abs
Temperature: in range 310°–450° C. (approx. isothermal reactor)
Space velocity: 5000 h$^{-1}$ (calculated to 20° C., 1 bar pressure)
Feed gas (dry)
% $^v$/v: Co 10, $CO_2$ 10, $H_2$ 80
Steam ratio: 1.15 by volume
Catalyst volume: 350 ml.

At the start each catalyst was subjected to the gas mixture, including steam, at 300° C. for 24 hours to reduce $Fe_2O_3$ to $Fe_3O_4$. Then the temperature was adjusted into the operating range. The outlet CO content was measured and a first order velocity constant calculated by substitution in the equation $$K = SV \log_e \frac{1}{1 - \frac{c}{Ce}}$$

where
K = rate constant in reciprocal seconds
SV = space velocity of the reacting gas expressed in ml of gas (including steam) passing over 1 g of catalyst per second as measured under reaction conditions.
C = percentage conversion of carbon monoxide
Ce = percentage conversion of carbon monoxide at equilibrium The values of K per gram of catalyst and per gram of iron are shown in Tables 4 and 5.

TABLE 4

| Values of rate constant per unit weight of catalyst | | | | |
|---|---|---|---|---|
| Temperature °C. | 330 | 345 | 355 | 365 |
| Catalyst 1 | NA | 0.07 | 0.09 | 0.11 |
| 2 | 0.06 | 0.085 | 0.13 | 0.18 |
| 3 | NA | 0.044 | NA | NA |

TABLE 4-continued

| Values of rate constant per unit weight of catalyst | | | | |
|---|---|---|---|---|
| Temperature °C. | 330 | 345 | 355 | 365 |
| Y | 0.067 | 0.105 | 0.145 | 0.21 |

TABLE 5

| Values of rate constant per unit weight of iron | | | | |
|---|---|---|---|---|
| Temperature °C. | 330 | 345 | 355 | 365 |
| Catalyst 1 | NA | 0.11 | 0.15 | 0.19 |
| 2 | 0.088 | 0.14 | 0.19 | 0.28 |
| 3 | NA | 0.077 | NA | NA |
| Y | 0.085 | 0.13 | 0.18 | 0.25 |

It is evident that catalysts 1-3 are comparable in activity to the commercially available iron-chrome catalyst Y.

I claim:

1. A process of reacting carbon monoxide with steam to give carbon dioxide and hydrogen carried out over a catalyst consisting essentially of iron oxide and at least one further oxide that is at least as difficult to reduce to metal as divalent chromium oxide, contains metal exerting a valency of at least 2 and is incapable of forming a mixed oxide having the spinel structure $M^{II}M^{III}_2O_4$, where $M^{II}$ is a divalent metal and $M^{III}$ is a trivalent metal, wherein said further oxide is selected from the group consisting of calcium, strontium and barium and is present in an amount between 8-25% calculated as equivalent CaO, the content of spinel-forming oxide other than iron oxide being less than 1% w/w, the catalyst having the following properties:

Surface area $m^2g^{-1}$: 50-100
Helium density g $cm^{-3}$: 3.0-4.0
Mercury density g $cm^{-3}$: 1.4-1.8
Pore volume $cm^3g^{-1}$: 0.2-0.5
Mean pore radium nm: 6-10.

2. A process of reacting carbon monoxide with steam to give carbon dioxide and hydrogen carried out over a catalyst consisting essentially of iron oxide and at least one further oxide selected from the group consisting of calcium, strontium and barium, said further oxide being present in the range 8-25% by weight calculated as equivalent CaO, the content of spinel-forming oxide other than iron oxide being less than 1% w/w, the said oxides having been brought together by double decomposition of their nitrates with an alkaline precipitant and having the following properties:

Surface area $m^2g^{-1}$: 50-100
Helium density g $cm^{-3}$: 3.0-4.0
Mercury density g $cm^{-3}$: 1.4-1.8
Pore volume $cm^3g^{-1}$: 0.2-0.5
Mean pore radius nm: 6-10.

* * * * *